Feb. 17, 1948. R. L. WILCOX 2,436,342
METHOD AND MEANS FOR MAKING NUT BLANKS OR THE LIKE
Filed July 12, 1943 4 Sheets-Sheet 1
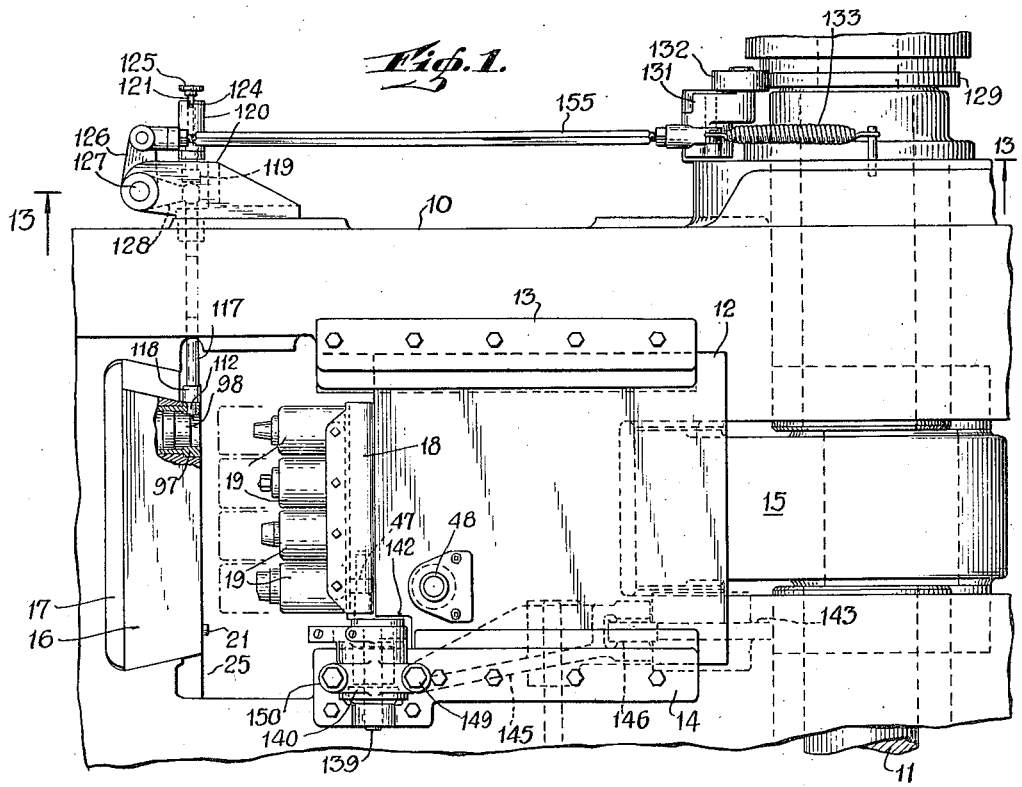
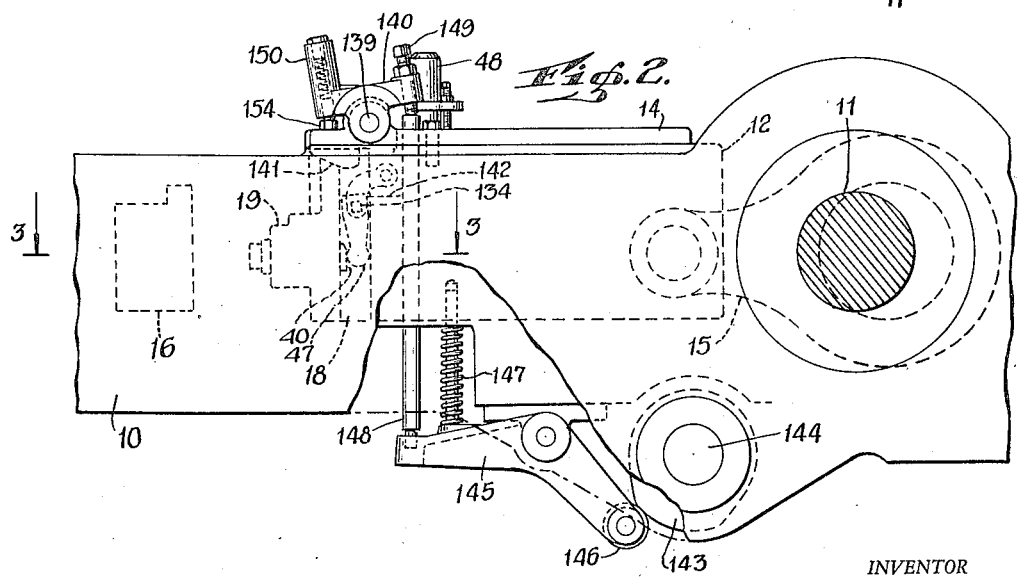
INVENTOR
RICHARD LESTER WILCOX
BY
ATTORNEY Feb. 17, 1948.   R. L. WILCOX   2,436,342
METHOD AND MEANS FOR MAKING NUT BLANKS OR THE LIKE
Filed July 12, 1943   4 Sheets-Sheet 2
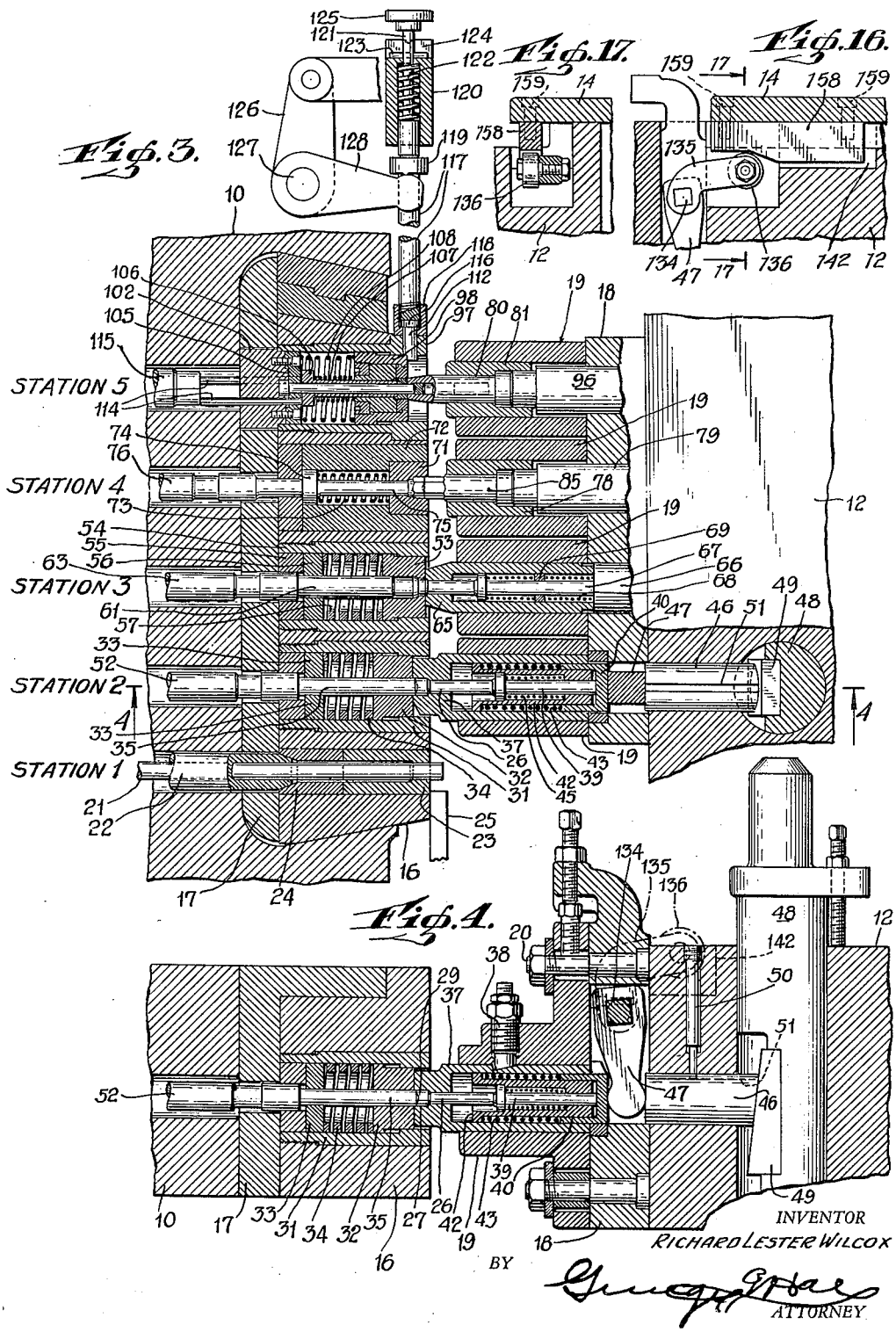

Feb. 17, 1948. R. L. WILCOX 2,436,342
METHOD AND MEANS FOR MAKING NUT BLANKS OR THE LIKE
Filed July 12, 1943 4 Sheets-Sheet 3
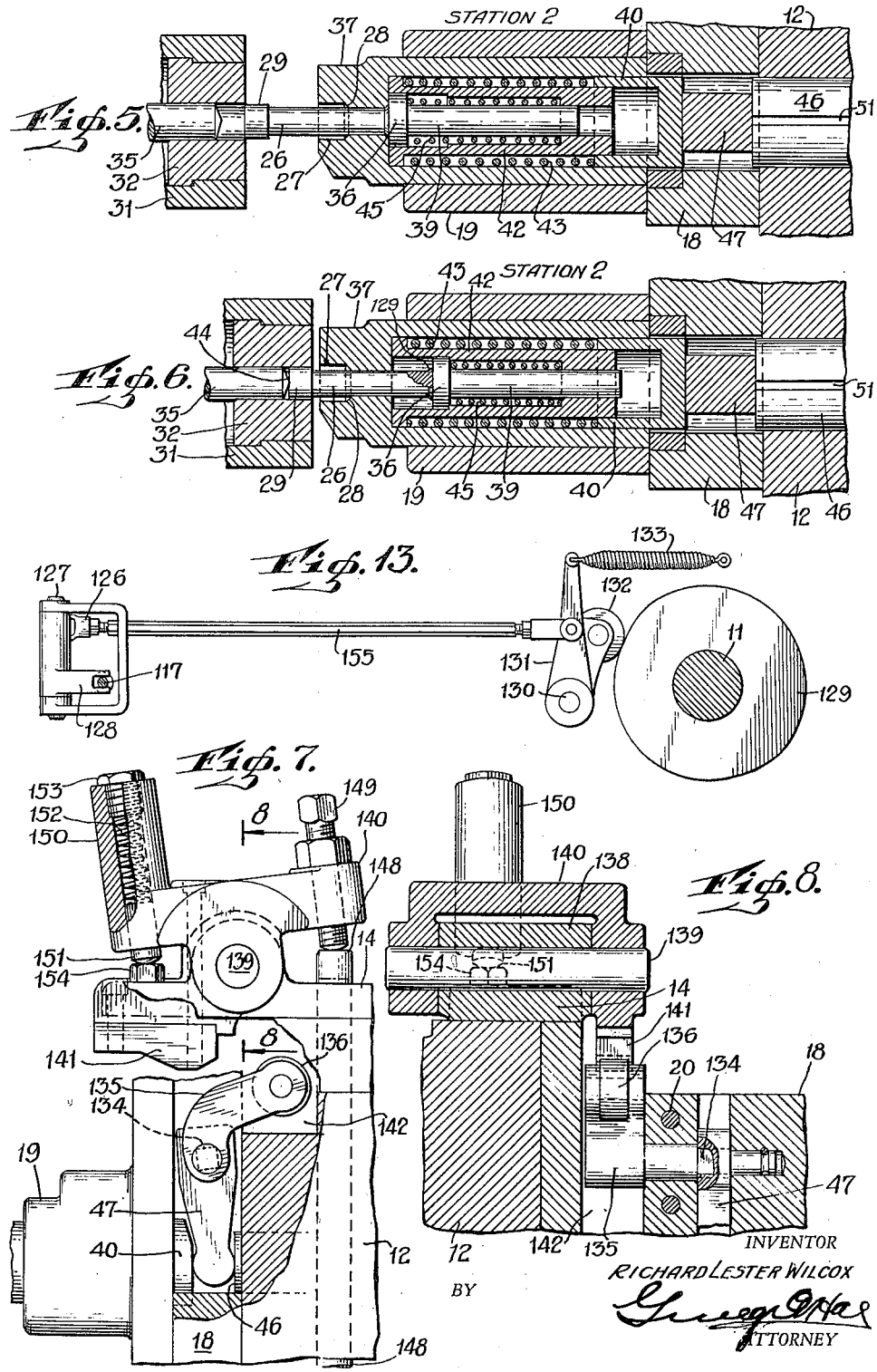

Feb. 17, 1948. R. L. WILCOX 2,436,342
METHOD AND MEANS FOR MAKING NUT BLANKS OR THE LIKE
Filed July 12, 1943 4 Sheets-Sheet 4
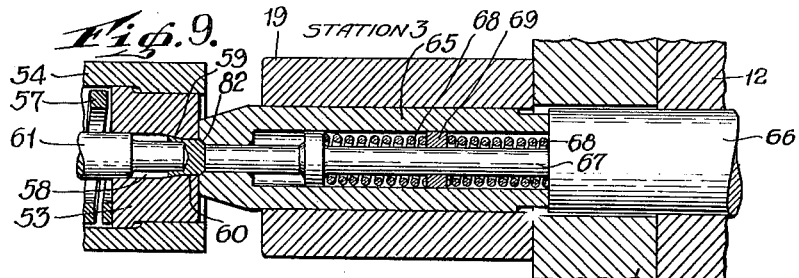
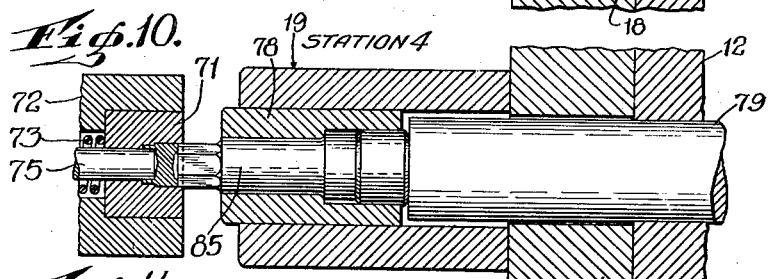
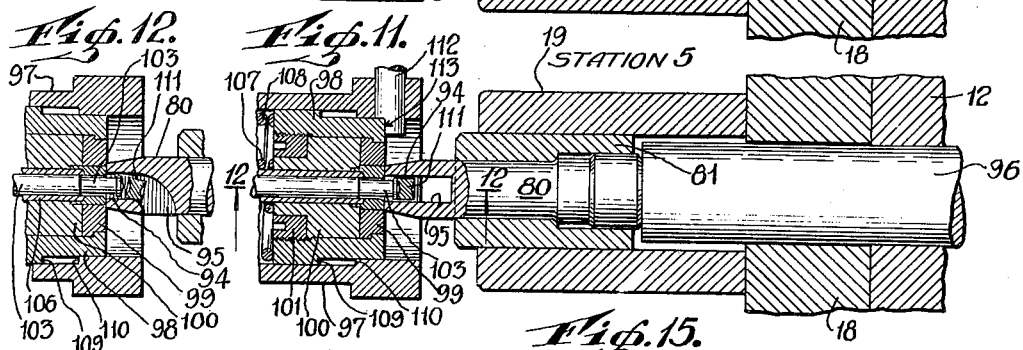
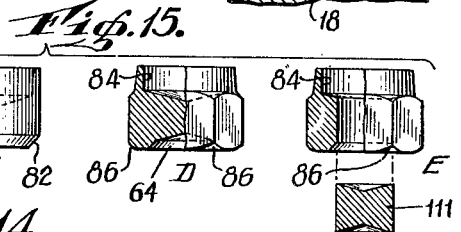
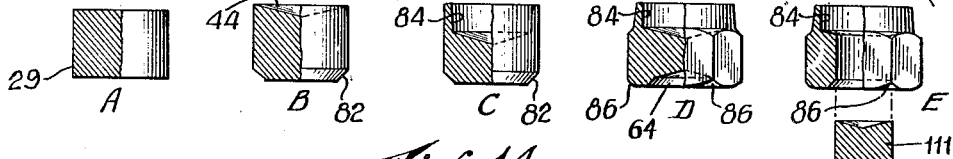
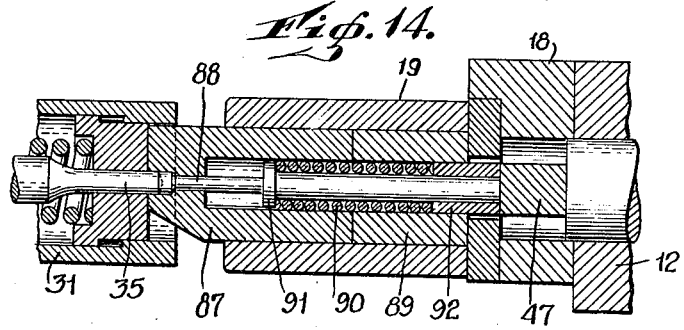
INVENTOR
RICHARD LESTER WILCOX
BY
ATTORNEY Patented Feb. 17, 1948

2,436,342

UNITED STATES PATENT OFFICE 2,436,342

METHOD AND MEANS FOR MAKING NUT BLANKS OR THE LIKE

Richard Lester Wilcox, Waterbury, Conn., assignor to The Waterbury Farrel Foundry and Machine Company, Waterbury, Conn., a corporation of Connecticut Application July 12, 1943, Serial No. 494,338

36 Claims. (Cl. 10—86)

1

This invention relates to a new and improved method and means for making nut blanks or the like. The particular form of nut blank designed to be produced by this invention has a so-called bottom portion of the conventional type, polygonal in cross section, and a top portion preferably cylindrical in cross section, having a recess therein designed to receive an insert member.

While the nut blank described is the one illustrated herein, the invention is not limited to such form, or to a nut blank, but may be utilized for other forms of nut blanks and other articles of manufacture.

It is the object of this invention to automatically manufacture from a workpiece a nut blank, or like article, in one machine, by a plurality of successive and synchronous operations upon a plurality of workpieces during each cycle of operations of the machine.

It is contemplated that these blanks be produced from cold stock although not limited thereto, such stock being preferably in the form of a rod or the like, from which a portion cut therefrom provides a workpiece for fabrication in the manner substantially as herein described.

To these ends, this invention consists of the means and method for making a nut blank or the like, as hereinafter more particularly described and pointed out in the claims, reference being had to the drawings, which illustrate a preferred form and application of the invention, and wherein like numerals of reference indicate like parts in the several figures:

Figure 1 is a fragmentary view of a header, upsetting machine or the like, organized with means to utilize the invention herein disclosed;

Figure 2 is a fragmentary elevation thereof;

Figure 3 is an enlarged fragmentary sectional view of a portion of the header and the several punches, dies, etc., the parts in section being taken generally upon line 3—3 of Figure 2;

Figure 4 is an enlarged sectional view of a portion of the die block, a punch holder, the gate and adjacent parts, taken generally upon line 4—4 of Figure 3;

Figures 5 and 6 are enlarged fragmentary sectional views of portions of the mechanism at station 2 in different relative advanced positions, the parts in section being taken generally upon line 4—4 of Figure 3;

Figure 7 is a fragmentary detail view of a portion of the knockout mechanism at station 2, and some adjacent parts;

Figure 8 is an enlarged view of some of the parts illustrated in Figure 7, those in section being taken generally upon line 8—8 of Figure 7;

Figures 9, 10 and 11 are enlarged fragmentary sectional views of portions of the mechanisms at stations 3, 4 and 5, respectively;

Figure 12 is a fragmentary sectional view of the piercing die and adjacent mechanism at station 5 with the forward end of the punch in a position substantially at a right angle to the position of the same punch in Figure 11;

Figure 13 is a view of a portion of the mechanism for intermittently holding the die at station 5, the parts in section being taken generally upon line 13—13 of Figure 1;

Figure 14 is a fragmentary sectional view of a modified form of the mechanism at station 2, the parts in section being taken generally upon a line similar to 4—4 of Figure 3;

Figure 15 illustrates a workpiece as shaped after successive operations thereon and the completed nut blank, in each instance the workpiece and nut blank being partly in section for purposes of clarity;

Fig. 16 is a fragmentary sectional view showing a cam mechanism of modified form for operating the cam arm 47 (Fig. 7);

Fig. 17 is a sectional view on line 17—17 of Fig. 16.

As this invention is particularly adapted for association with a header, upsetting mechanism or the like, it is, therefore, illustrated with and described in connection therewith, but not limited thereto in its application.

In the drawings, 10 designates the header body, 11 the crank shaft, 12 the gate movable in the body beneath the caps 13 and 14, and 15 is the pitman through which a reciprocating motion is imparted to the gate from the crank shaft.

The die block 16 is secured within the body 10 against a backing plate 17. Within this die block are assembled a plurality of sets of dies and associated parts, preferably spaced substantially equally distant from each other, at places for convenience in description, severally designated as stations 1 to 5, inclusive.

Upon one face of the gate 12 is a punch plate 18, having a plurality of punch holders 19, one for each of the stations 2 to 5, inclusive. Companion bolts 20, and the nuts and washers thereon, provide convenient means for securing in a well known manner the punch holders 19 in their several adjusted positions.

At station 1 a rod or wire length 21 is intermittently fed through a quill 22, a cut-off die 23, and a backing block 24 therefor. The end that projects beyond the face of the cut-off die is thus in advance of a cutter 25. The described mechanism at this station is of the conventional form and operation.

Threaded into the die block 16 at station 2 is a sleeve 31, within which is a container die 32, having an opening therethrough substantially the same or slightly larger in diameter than the rod 21. Between this die and a collar 33 is a spring 34 that normally urges the die 32 outwardly and resists its inward movement. In the sleeve 31 and die 32 is a punch 35. Within a punch holder 19, concentric with the die 32, is a punch 37, held by a well known fastening unit 38. In the outer end of this punch is a recess or cavity 27, with a conical bottom wall 28 that is substantially the same diameter as the rod 21. Within the punch 37 is a movable sleeve 42, a cup 40, a spring 43 encircling the sleeve between the head of the sleeve and the cup, and a head pin 39 urged in one direction by a spring 45. Generally, the springs 43 and 45 are of different strength, the former being the stronger, but their relative strength may be otherwise varied. Also movable in the punch 37 is a second pin 26, having a head 129 on its inner end, which is in engagement with the head 36 of the pin 39. In one position the outer end of the pin 26 projects beyond the face of the punch.

In the gate 12 is a plug 46, held against rotation by the pin 50 that projects into a keyway 51 and against unlimited movement in one direction by the axially adjustable wedge 48. An angular face upon a plate 49 upon this wedge contacts with a similar angular face on the plug 46. By adjustment of the wedge 48 within the gate 12 the axial position of the plug 46 may be varied.

When the punch 37 is in a retracted position, the pin 26 projects beyond the end thereof and the face of the die 32 is flush with that of the sleeve 31, substantially as shown in Figures 5 and 6. In operation, the projecting portion of the rod 21, at station 1, is severed by the cutter 25 and the workpiece 29, shown at A in Figure 15, is transferred to station 2. During the cycle of operations the gate 12 moves toward the die block and the pin 26 engages and projects the workpiece 29 into the opening in the die 32 from the cutter 25. During the continued advance of the punch 37, the pressure of the spring 45 against the head 36 of the pin 39 holds the pin 26 in contact with the workpiece. The pressure of spring 45 against the bottom of the chamber of the sleeve 42 is absorbed by the spring 43 between the head of the sleeve and the cup 40. Thus the spring 43 urges the sleeve 42 toward its outward position with the head of the sleeve against a wall of the chamber in the punch 37, the pressure of pin 26 first compressing the spring 45. Continued forward movement of the punch 37 brings the latter into engagement with the face of the die 32 and moves the same inwardly against the pressure of spring 34 until the limit of such forward movement has been reached. During this action the spring 45 is compressed until the head 36 on spring pin 39 engages a shoulder in the chamber of the sleeve 42.

As the gate 12 advances with the outer end of the pin 26 projecting beyond the face of the punch 37, the pin contacts the workpiece in the cutter and pushes it into the opening of the die 32 and holds it against the conical end of the then stationary pin 35 within the die 32. As the gate continues its advance, the springs 43 and 45 continue to compress as the punch 37 forces back the die 32 within the sleeve 31 until the end of the pin 39 rests against the bottom wall of the cup 40, at which time the cup 40 is against the ball end of the arm 47 in contact with the plug 46. The pins 26 and 39 can yield no further when in these relative positions, and hence will withstand any end pressure on the pin 26. The outer face of the pin 26 forms a bottom for the recess or cavity 27 in the punch 37. The workpiece during this operation is ejected from the die by the stationary pin 35 and projected into the recess or cavity 27. The workpiece is now confined in the recess 27 and at the last forward motion of the gate the workpiece is simultaneously coned on one end, as designated by 82, by the shape of the bottom portion of the recess 27 and conically recessed at the other end, as designated by 44, by the pressure on the end of the pin 35. These operations result in shaping the workpiece as is shown by "B" in Figure 15.

As the gate, with the punch 37, returns from its forward position, the blank "B" is held between the pins 35 and 26, first by the knockout mechanism until the workpiece is ejected from the recess 27 in the punch 37, and then for a further length of time by the springs 43 and 45 until the head 129 on the pin 26 engages a wall of the chamber of the punch 37. The pin 26 now recedes leaving the blank "B" in the opening of the die 32 and against the conical end of the pin 35 for a length of time sufficient to permit the transfer mechanism to come into alignment and then the pin 35 advances and ejects the blank "B" from the die 32 and into the transfer mechanism to be carried to station 3.

Figure 5 illustrates the position of the parts at station 2 as the workpiece 29 is about to be projected out of the cutter 25 into the opening in die 32.

Figure 6 illustrates the position of the parts with the workpiece 29 held against the conical end of the pin 35 by the pin 26.

During the withdrawal of the punch 37, the die 32, under the action of the compression spring 34 is moved outwardly again until the shoulder thereon engages a shoulder in the bore of the die, at which time the face of the die is flush with the face of the sleeve 31. As the workpiece is held positively and rigidly between the punch 35 and the pin 26, the die 32 telescopes over the then stationary workpiece, and again enters the bore of the die 32, and the punch 37 is stripped therefrom. After the pin 26 has moved away from the die a sufficient distance to permit the transfer mechanism to register with the workpiece 29 at station 2, the punch 35 is projected forwardly by the knockout rod 52 actuated in a well known manner, and the workpiece is ejected from the die 32 and into the transfer mechanism, which thereafter carries it to station 3. By the operations at station 2 the workpiece 29 has been squared or fashioned at each end, thus eliminating any irregularities that may have resulted from the cut-off operation, and a conical recess 44 is impressed in one face and the opposite end is coned, as at 82, substantially as shown at "B" in Figure 15. These operations first project the workpiece into the die 32; the workpiece is projected therefrom and into the cavity of the punch, where the end thereof opposite the recessed face is squared and coned; then the workpiece is ejected from the punch and projected into the die 32 again and finally ejected from the die and into transfer mechanism. Thus at one station the workpiece is fabricated at both ends. The mechanism at station 2, hereinbefore described, is utilized for fabricating relatively large size blanks, wherein a long motion of the pin 26 is required. This construction utilizes two springs 43 and 45, each synchronously taking a fractional portion of the required motion for the pin 26. For relatively small size blanks the mechanism particularly shown in Figure 14 is advantageous and effective. In this form, 87 indicates the punch, held within a punch holder 19, and which abuts against a backing collar 89, within which and the punch a spring pin 88 is movably mounted. Encircling this spring pin is a spring 90, between the collars 91 and 92. When the punch 87 is in its retracted position the outer end of the spring pin 88 projects beyond the face of the punch 87. With the exception of the utilization of two springs 43 and 45 with their associated sleeve, cup, etc., this form of mechanism functions substantially the same as the mechanism first hereinbefore described.

The rock arm 47 is fitted onto an angular portion 134 of the shank of an arm 135 journaled in the punch plate 18 and carrying a cam roll 136 near the end thereof, and held against lateral movement by any conventional means. The cam roll 136 and a portion of the arm 135 project into and function within a recess or pocket 142 in the gate.

On the cap 14 is a boss 138, through which is a pin 139, upon which is journaled a rock member 140, having fixed thereon a cam piece 141. As the gate reciprocates, the cam roll is carried therewith and engages the cam 141 when it is in the path thereof, that is at the approximate start of the return of the gate. Such engagement rocks the arm 47 and the ball end thereof moves toward the die block at the same relative speed as the gate, thus holding the pin 26 in engagement with the workpiece until the face of punch 37 has been moved out of contact with the die 32. After the workpiece has been stripped from the punch 37, the rock arm 47 returns to its former position. The rock member 140 is moved upon its axis in timed relation with the movement of the gate 12, thus at times, the cam piece is out of the path of the cam roll. The mechanism for actuating this member 140 comprises generally a cam 143, upon a shaft 144, a rock arm 145 having a cam roll 146 thereon, held against the cam 143 by a suitable spring 147, a rod 148 having engagement at one end with the rock arm 145 and at the other end with an adjustable screw 149 in the rock member 140. As the cam 143 rotates, the rod 148 actuates the rock member 140 and cam piece 141. In the boss 150 on the rock member 140 is a plug 151, which is urged outwardly by a spring 152 positioned against a screw 153. Near or at the limit of the stroke of the rod 148 and motion of the rock member 140 in one direction, the plug 151 engages a fixed part, as a screw head 154 and whereby any overthrow or lost motion is absorbed.

At station 3 there is a die 53 movable within a fixed sleeve 54, within the bore of which is a backing block 55, a collar 56, and a compression spring 57. Through the die 53 is a bore 58 of plural diameters, joined by a throat 59, the smaller diameter of which is designated 60, and is substantially the same diameter as the workpiece. Projecting into this die is a punch 61 with a working tip of reduced diameter that is slightly tapered, with a conical end face (Fig. 9), substantially the same shape as the end of punch 35 at station 2. In a punch holder 19 at this station is a punch 65, which abuts against a backing plug 66 and contains a pin 67 that in one position projects beyond the face of the punch. Surrounding the pin is a two part compression spring 68, separated by a collar 69, which combine to urge the pin outwardly. With the outer face of the die 53 flush with the face of the sleeve 54, the workpiece, as formed at station 2, is presented to station 3. As the gate moves toward the die block with the workpiece so positioned, the pin 67 engages the workpiece, ejects it from the transfer mechanism and projects it into the opening of the die 53. The pin 67 maintains its contact with the workpiece under the urge of the spring 68. The punch 65 continues its forward movement until it engages the die 53 during which time both the punch 65 and pin 67 move forward as a unit, the punch pushing the die 53 inwardly against the tension of spring 57, the pin maintaining its contact with the workpiece. During the latter part of this movement the inner end of the workpiece under pressure of the pin 67 is flared outwardly by the tip of the punch 61 into the throat within the bore of the die 53. The conical end 82 of the workpiece is preserved during this operation by being seated in the recess in the punch 65. As the gate returns, the punch 65 is withdrawn from its engagement with the die 53, which, under the pressure of spring 57, is moved outwardly until its face is again flush with the face of sleeve 54. The knockout rod moves the punch 61 forwardly and extrudes the workpiece through the bore 60 in the die 53. This extrusion restores the outside diameter and straight walls of the workpiece, at the same time deepening the depression 84 in one end of the workpiece, which is now in the form substantially as shown at C in Figure 15. The inner wall of the recess 84 now slightly tapers toward the bottom thereof, corresponding with the tapered tip of the punch 61. The conical end 82 of the workpiece formed at station 2 is still preserved.

At station 4 a die 71 is held within a die holder 72 in the die block 16, and formed with a recess at its outer end that is substantially polygonal in cross section, corresponding in shape and area with that of the cross sectional area of the polygonal bottom portion (illustrated as hexagonal) of the finished blank and a substantially cylindrical recess opening into the polygonal recess. The walls of the cylindrical recess are slightly tapered outwardly.

Within the die 71 is a punch 75, surrounded in part by a spring 73, between the die 71 and a punch collar 74. A knockout pin 76, operating in the usual manner, engages the punch 75. The outer end of this punch is substantially the same diameter as the inside of the recess 84 in the workpiece. In a punch holder 19 on the gate at this station is a punch support 78 that carries a punch 85, the outer end of which is substantially polygonal in cross section and of substantially the same shape and area as the cross section of the polygonal portion of the finished blank. This punch is backed by a plug 79 carried by the gate. As the gate moves forward, the punch 85 engages the workpiece that has been presented in front thereof by the transfer mechanism and is projected into the recess in the die 71, with the inner end of the workpiece in the cylindrical portion of the recess and the outer end of the punch 75 in the recess 84 of the workpiece. Under the pressure of the punch 85 the metal in the outer portion of the workpiece is caused to flow radially and fill the polygonal recess in the die 71 and thus in part shape the blank and form the depression 64 in the bottom face of the bottom of the workpiece. The conical end of the workpiece, which has been preserved since it was formed at station 2, becomes the chamfered face 86 of the blank at this station. After the gate has been withdrawn, the workpiece, through the action of the knockout pin 76, is ejected from the die 71 and carried by the transfer mechanism into line with station 5. As completed at this station (4) the workpiece has a polygonal bottom portion with a conical depression in one end and a cylindrical top portion with an outer wall, slightly tapered outwardly toward the polygonal portion and with a recess therein, having substantially straight walls, substantially as shown at D in Figure 15. The workpiece is now transferred to station 5. At this station, a punch 80, backed by a plug 96, is within the support 81 in a punch holder 19. The opening 94 in the end of this punch is substantially the same in diameter as that of the slug 111 cut from the workpiece. This opening in the rear of the face of the punch 80 is curved outwardly to form a slug escape opening 95.

Threaded in the die block is the sleeve 97, within which is a movable die holder 98, a spring 108 and a piercing punch 103 secured in position on the backing member 102 by the cap 105, and encircled in part by a bushing 106, between the head of which and the die holder 98, is a coil spring 107. Within the die holder is a container die 99, the outer face of which is substantially flush with that of the die holder and held fixed therein by a filler block 100, secured in place by a nut 101. As so constructed and assembled, the die holder 98, container die 99, block 100 and nut 101 constitute a unitary structure. The outward position of the die holder 98 is limited by a shoulder 109 on the die holder 98 engaging a shoulder 110 in sleeve 97. That portion of the punch 103 just back of the cutting end thereof is of reduced diameter.

Through the die 99 is an opening, the cross sectional shape and area of which is substantially the same as the cross section of the bottom polygonal portion of the workpiece. The workpiece is pushed out of the transfer mechanism into the opening in the die 99 by the punch 80. At this time the top cylindrical portion of the workpiece is within a recess of the block 100 and the bottom hexagonal portion is in the container die 99. Further movement of the punch 80 pushes back the unit 98 against the compression spring 107. During this time the outer cutting end of the punch 103 is forced through the workpiece severing a slug 111 therefrom which passes through the opening 94 in the punch 80 and escapes through the opening 95 into a receptacle conveniently arranged to receive it. The wall of the cylindrical portion of the workpiece is relatively thin and is within the recess in the filler block, which is of substantially the same diameter. Any expansion resulting from the piercing operation is accommodated by the polygonal recess in the container die 99, which is slightly larger than that of the workpiece as formed at station 4. The container die 99, with the workpiece therein, is pushed inwardly by the punch 80 a sufficient distance for the piercing punch 103 to pass through the workpiece and to allow a pin 112 to advance in front thereof and hold the die holder 98 and associated parts rigid and against outward movement as the punch 80 is withdrawn. The inner end of the pin 112 is flattened at 113 and projects into the opening or bore of the sleeve 97 (Fig. 11).

The outer end of the bushing 106 is substantially the same diameter as the recess 84 in the workpiece, and is advanced by a plurality of pins 114 actuated by a knockout rod 115 in a well known manner. As advanced, the outer end of the bushing engages the bottom of the recess 84 and strips the workpiece first from the container die 99 and second from the then stationary piercing punch 103, projecting the same as a completed blank into the transfer mechanism. The workpiece is held in the transfer mechanism a sufficient time to allow the bushing 106, under the urge of the coil spring 107, to withdraw and return to its former rear position. When the bushing 106 has moved inwardly a distance that is at least equal to the depth of the recess in the top of the workpiece, the transfer mechanism carries the workpiece to a position where it is released and escapes as a completed blank, substantially as shown at E in Figure 15, and drops into a conveniently positioned receptacle. When the workpiece has been stripped from the container die 99, the pin 112 is withdrawn and the spring 108 moves the die holder 98 to its outer position.

A head 116 on the pin 112 is held against a sliding rod 117, having a head 119 at its outer end, by a threaded cap 118, and against rotation by any convenient and well known means.

Secured to the body 10 is a bracket 120, having a lug thereon. In this lug is a spring plunger 121, one end of which engages the head 119 of the rod 117 (Fig. 3) under the tension of the compression spring 122.

On the shaft 11 is a cam 129, and journaled upon a fixed pin 130 is a rock arm 131 carrying a cam roll 132, which is held against the periphery of the cam 129 by the spring 133. A rod 155 adjustable in length by any convenient means, connects the rock arm 131 and the lever 126. The timing of the cam is such that through the mechanism described the pin 112 is projected in front of the movable die holder 98 when in its retracted position and prevents outward movement thereof, as the slug 111 is pierced from the workpiece by the punch 103.

When it is desired to replace a punch 103, the operator grasps the hand knob 125, pulling out the plunger 121 against the tension of the spring 122 until the cross pin 123 therethrough is out of the slot 124 and then turning the plunger about 90° until the cross pin rests in a notch in the end of the bracket 120. This cross pin holds the plunger 121 in its out position and away from the head 119. The cap 118 is then removed and the rod 117 is pushed back so that the pin 112 is free to be removed, allowing the sleeve to be separated from the die block. After the new punch has been inserted the parts are restored to their former relative positions.

Intermittent movement of the pin 112 in timed relation with the movement of the die holder 98 is accomplished through a lever 126 pivotally mounted on the pintle 127. The arm 128 on this lever is forked over the rod 117 and bears against one face of the head 119.

Experience has demonstrated that where a workpiece, as a nut or the like, is pierced within a recess or cavity that does not allow the nut to expand freely, and then drawing the piercing punch out of the pierced hole, there is great danger of breaking off the outer end of the piercing punch. This danger is obviated in the construction herein shown, wherein the container die 99 is held in its rear position by the pin 112, and the pierced workpiece is first removed from the recess of the die. This allows the workpiece to expand before it is stripped from the piercing punch, as a result, stripping the nut from the container die and from the piercing punch is not synchronous, the former operations preceding the latter.

As the piercing punch 103 is larger at its cutting end and reduced in diameter for a limited distance in rear of the end, the workpiece rests and is free on the reduced portion of the piercing punch after it is stripped from the die.

These operations and their described sequence are especially advantageous where there is a relatively small mass of metal between the hole and the outer wall of the workpiece.

The end of the punch 35 is referred to herein as being conical, but in fact it may be any other desired shape, its function being to form a depression in the end of the workpiece. Likewise, one end of the workpiece is referred to as being conical, as shaped at station 2, a description used in the art, and therefore, used herein. In fact the edges of the workpiece are flared, and the end thereof presents an appearance more nearly approaching the frustum of a cone.

In Figures 16 and 17 another form of cam mechanism is shown, wherein a cam 158 is fixed to the cap 14 by screws 159 or the like. The cam roll 136 is in constant contact with this cam except during the last portion of the forward movement of the gate.

Within the scope of the appended claims, changes and alterations may be made other than as suggested herein.

What is claimed is:

1. The step in producing a nut blank or the like from cold stock, which consists in punching a hole through a partially completed blank while held in a confining recess or cavity by a punch of reduced diameter in rear of the face thereof, then moving a stripping tool axially of the punch to strip the punched blank from the recess or cavity and finally stripping the blank from the punch.

2. The method of producing a nut blank or the like from a solid piece by forming a recess in one end and coning the opposite end by endwise pressure applied at the same station, then deepening the recess while retaining the coned end, then shaping the piece so that a portion thereof is polygonal in cross section and a portion substantially cylindrical on top thereof; and then piercing a hole through the piece while held within a confining recess or cavity in a die, then stripping the piece from the die and finally from the hole piercing tool.

3. The method of producing a nut blank or the like, from a solid metal piece by forming a recess in one end and coning the opposite end by endwise pressure applied at the same station, then deepening the recess while retaining the coned end, then shaping the metal piece so that a portion thereof is polygonal in cross section and a portion substantially cylindrical on top thereof, with a recess therein, and then piercing a hole through the metal piece that is an extension in part of said recess, while held within a confining recess or cavity, then stripping the metal piece from the die, and finally from the hole piercing tool.

4. The method of producing a nut blank from solid metal which comprises applying pressure to a solid workpiece to produce a nut blank or the like with a bottom portion polygonal in cross section and a top portion that is substantially cylindrical in cross section with a recess therein that is substantially the same depth as the height of the cylindrical portion, and thereafter piercing a hole through the bottom portion in extension of the said recess.

5. The method of producing a nut blank from a workpiece of solid metal which comprises applying pressure to a workpiece to produce a nut blank with a bottom portion polygonal in cross section and a top portion that is substantially cylindrical in cross section with a recess therein that is substantially the same depth as the height of the cylindrical portion, and thereafter piercing a hole through the bottom portion in extension of the said recess, the diameter of the said recess being larger than the said hole.

6. The method of producing a nut blank from a workpiece of solid metal which comprises applying pressure to the workpiece to produce a nut blank or the like with a bottom portion polygonal in cross section and a top portion that is substantially cylindrical in cross section with a recess therein that is substantially the same depth as the height of the cylindrical portion, and thereafter piercing a hole through the bottom portion in extension of the said recess, the inner wall of the top portion being substantially straight and the exterior wall tapered outwardly toward the bottom portion.

7. The method of producing a nut blank or the like, from a solid metal piece by forming a recess in one end and coning the opposite end by endwise pressure applied at the same station, then deepening the recess while retaining the coned end, then shaping the metal piece so that a portion thereof is polygonal in cross section and a portion substantially cylindrical on top thereof, with a recess in the cylindrical portion, the said coned end becoming a chamfered face of the polygonal portion, and then piercing a hole through the metal piece, that is an extension in part of said recess, while the piece is held within a confining recess or cavity in a die, then stripping the metal piece from the die, and finally from the whole piercing tool.

8. Mechanism for making a nut blank or the like, comprising in part a movable die, having an opening therethrough; a punch with a conical end projecting into the opening; a second punch having a recess or cavity with a conical bottom in one end thereof; a pin movable within the second punch; means for actuating the pin, whereby a workpiece will be first projected thereby into the movable die and against the conical end of the punch, and then through engagement of the second punch with the die projecting the workpiece into the recess or cavity in the second punch, and then by continued pressure forming a depression in one end of the workpiece and coning the opposite end and by movement of the die and second punch stripping the workpiece from the second punch and holding it in the path of the transfer mechanism.

9. Mechanism for making a nut blank or the like, comprising in part a movable die, having an opening therethrough; a punch with a conical end, projecting into the opening; a second punch having a recess or cavity with a conical bottom in one end thereof; a pin movable within the second punch and in one of its positions an end thereof providing the bottom of said recess or cavity and forming a platform closure therefor; means for actuating the pin, whereby a workpiece will be first projected thereby into the movable die and against the conical end of the punch, and then through engagement of the second punch with the die projecting the workpiece into the recess or cavity in the second punch, and then by continued pressure forming a depression in one end of the workpiece and coning the opposite end and by movement of the die and second punch stripping the workpiece from the second punch; means for moving the punch, whereby the workpiece will be ejected from the die; and mechanism for applying pressure to the pin to maintain its contact with the workpiece during the stripping of the workpiece from the second punch.

10. Mechanism for making a nut blank or the like, comprising in part a movable die, having an opening therethrough; a punch with a conical end, projecting into the opening; a second punch having a recess or cavity with a conical bottom in one end thereof; a pin movable within the second punch and in one of its positions an end thereof providing the bottom of said recess or cavity and forming a platform closure therefor; means for actuating the pin, whereby a workpiece will be first projected thereby into the movable die and against the conical end of the punch, and then through engagement of the second punch with the die projecting the workpiece into the recess or cavity in the second punch, and then by continued pressure forming a depression in one end of the workpiece and coning the opposite end and by movement of the die and second punch stripping the workpiece from the second punch; means for moving the punch, whereby the workpiece will be ejected from the die; and mechanism for applying pressure to the pin to maintain its contact with the workpiece during the stripping of the workpiece from the second punch, comprising in part elements that derive motion through movement of the gate.

11. Mechanism for making a nut blank or the like, comprising in part a movable die, having an opening therethrough; a punch with a conical end, projecting into the opening; a second punch having a recess or cavity with a conical bottom in one end thereof; a pin movable within the second punch and in one of its positions an end thereof providing the bottom of said recess or cavity and forming a platform closure therefor; means for actuating the pin, whereby a workpiece will be first projected thereby into the movable die and against the conical end of the punch, and then through engagement of the second punch with the die projecting the workpiece into the recess or cavity in the second punch, and then by continued pressure forming a depression in one end of the workpiece and coning the opposite end and by movement of the die and second punch stripping the workpiece from the second punch; means for moving the punch, whereby the workpiece will be ejected from the die; and mechanism for applying pressure to the pin to maintain its contact with the workpiece during the stripping of the workpiece from the second punch, comprising in part a member movable with the gate, a cam in the path thereof, and means for projecting the cam into and out of the path of said movable member.

12. In mechanism of the character described, the combination with the gate or the like; of a punch mounted thereon; a pin within the punch; and mechanism for applying an independent pressure to the pin during a movement of the gate, comprising in part a rockable arm, one position of which is in line with said pin, a cam arm associated with the rockable arm, both of said arms reciprocating with the gate, a cam connected with the gate that actuates the rockable arm during movement of the gate, and means for moving the cam into and out of the path of the cam arm and whereby motion is given to the rockable arm.

13. In mechanism of the character described; a gate or the like; a member associated with the gate and having independent relative movement thereon, the combination therewith of means for applying pressure to the member during movement of the gate in one direction, comprising in part a rock member journaled on a fixed part, a cam thereon, a shaft, intermediate lever means for actuating the latter in one direction, a rockable arm in engagement with said member and an element connected with the rockable arm and in the path of said cam when the latter is in one of its positions.

14. Mechanism for making a nut blank or the like, comprising in part a movable die having an opening therethrough; a punch projecting into the opening; a second punch having a recess or cavity with a conical bottom in the end thereof; a pin movable within the second punch; means for moving the second punch toward and against the die and stripping the die from a workpiece therein, at the same time causing the workpiece to enter the recess or cavity in the second punch and moving the pin within the second punch until the end thereof is in substantially the same plane as the bottom of the recess or cavity and forming a platform for the workpiece.

15. Mechanism for making a nut blank or the like, comprising in combination a die block or the like, a die movably mounted therein, a punch that projects into the opening in the die, a reciprocating member movable toward and away from the die block, a punch connected with the reciprocating member substantially concentric with the movable die, means for presenting a workpiece between the movable die and second punch, and means connected with the movable die and second punch whereby the workpiece will be successively projected into the die and the second punch during a complete cycle of movement of the reciprocating member, and a depression formed in one end of the workpiece while in the movable die and the opposite end thereof coned while in the second punch.

16. Mechanism for making a nut blank or the like, comprising in part a movable die having an opening therethrough; a punch projecting into the opening; a second punch having a recess or cavity with a conical bottom in the end thereof; a pin within the second punch; and plural springs for moving the pin in one direction.

17. Mechanism for making a nut blank or the like, comprising in part a movable die having an opening therethrough, a punch projecting into the opening, a second punch cooperating with said die having a recess or cavity with a conical bottom in one end thereof, a pin within the second punch, and plural springs for moving the pin in one direction, one spring moving the pin for a portion of its stroke and the other spring moving the pin during the remaining portion of the stroke thereof.

18. Mechanism for making a nut blank or the like, comprising in part a movable die, a punch projecting into the opening, a second punch movable toward and away from the die, a sleeve within the second punch, a spring in part encircling the sleeve; a pin within the sleeve, one end of which in one of its positions projects beyond the end of the second punch; and a spring in part encircling the pin, the movement of the pin within the sleeve, away from the end thereof, first being resisted by the urge of the spring within the sleeve and then the spring encircling the sleeve.

19. Mechanism for making a nut blank or the like, comprising in part a movable die holder, a separable container die in the die holder, a piercing punch within the opening in the container die and fixed against movement, a punch movable toward and away from the container die and during its toward movement applying pressure to and forcing a workpiece within the container die against the piercing punch and projecting the same therethrough, thereby forming a hole through the nut blank.

20. Mechanism for making a nut blank or the like, comprising in part a die holder movable in a stationary member; a container die in the die holder, a piercing punch within the opening in the container die, a punch movable toward and away from the container die and during its toward movement applying pressure to and forcing a workpiece within the container die against the piercing punching and projecting the same therethrough, thereby forming a hole through the nut blank and moving the container die and die holder within the stationary member, and a stop member to retain the die holder in a retracted position.

21. Mechanism for making a nut blank or the like, comprising in part a die holder movable in a stationary member; a container die in the die holder, a piercing punch within the opening in the container die, a punch movable toward and away from the container die and during its toward movement applying pressure to and forcing a workpiece within the container die against the piercing punch and projecting the same therethrough, thereby forming a hole through the nut blank and moving the container die and die holder within the stationary member, a stop member to retain the die holder in a retracted position, and means for actuating the stop member in timed relation with the movement of the die holder.

22. Mechanism for making a nut blank or the like, comprising in part a die holder movable in a stationary member, a container die in the movable die, a bushing movable in the opening in the container die, a piercing punch within the bushing, a punch movable toward and away from the container die and during its toward movement applying pressure to and forcing a workpiece within the container die against the piercing punch and projecting the same therethrough, thereby forming a hole through the nut blank, and means for first ejecting the workpiece from the container die and then stripping the same from the piercing punch.

23. Mechanism for making a nut blank or the like, comprising in part a die holder movable in a stationary member; a container die in the die holder, a piercing punch within the opening in the container die, a punch moveable toward and away from the container die and during its toward movement applying pressure to and forcing a workpiece within the container die against the piercing punch and projecting the same therethrough, thereby forming a hole through the nut blank and moving the container die and die holder within the stationary member, a stop member to retain the die holder in a retracted position, and means for actuating the stop member in timed relation with the movement of the die holder, comprising in part cam actuated rock mechanism.

24. In a mechanism for making a nut blank or the like by pressure, comprising a plurality of companion tools at a plurality of independent stations, the tools at one station forming a recess in one end of the blank and coning it at the other end, at other stations shaping the blank so that a portion thereof is substantially polygonal in cross section and a portion substantially cylindrical in cross section with a recess in the cylindrical portion and a hole through the polygonal portion, the tools being so arranged that the operations are performed continuously and simultaneously on a separate blank at each station.

25. In mechanism for making a nut blank or the like by pressure, comprising a plurality of companion tools at a plurality of independent stations, the tools comprising means at one station for forming a recess in one end of the blank and coning it at the other end during a single cycle of movement of the tools, means at other stations for shaping the blank so that a portion thereof is substantially polygonal in cross section and a portion substantially cylindrical in cross section with a recess in the cylindrical portion and a hole through the polygonal portion, and means for advancing the tools simultaneously, so that the operations are performed continuously and simultaneously on a separate blank at each station.

26. In mechanism for making a nut blank or the like by pressure, comprising a plurality of companion tools at a plurality of independent stations, the tools comprising means at one station for forming a recess in one end of the blank and coning it at the other end, and means at the other stations for shaping the blank so that a portion thereof is substantially polygonal in cross section and a portion substantially cylindrical in cross section with a recess in the cylindrical portion and a hole through the polygonal portion, the said means first forming the recess with straight walls, and then with tapered walls, and means for advancing the tool simultaneously so that the operations are performed continuously and simultaneously on a separate blank at each station.

27. The step in producing a nut blank or the like from cold stock, which consists in fabricating a workpiece, which later becomes the completed blank, by first holding the workpiece by limited pressure between two members and then applying pressure at one end of the blank by one of said members and a third member sufficient to cause the metal in the workpiece to flow, and forming a recess in the opposite end thereof, and coning the end to which the last mentioned pressure was applied.

28. The step in producing a nut blank or the like from cold stock, which consists in fabricating a workpiece, which later becomes the completed blank, by first holding the workpiece by limited pressure between two members and against lateral movement, and then applying pressure at one end of the blank by one of said members and a third member sufficient to cause the metal in the workpiece to flow, and forming a recess in the opposite end thereof, and coning the end to which the last mentioned pressure was applied.

29. The method of producing a nut body or the like from a solid blank, which comprises forcing the blank into a tapered opening in a movable die against a stationary tool to form a recess in one end and at the same time flare outwardly the exterior of the blank around the recess, and then restoring the exterior of the blank to cylindrical form by forcing it from the die in a reverse direction.

30. The method of making a nut body, which consists in forcing a blank coned at one end into a rearwardly flared opening in a movable die against a stationary tool to form a recess in the other end of the blank and flare the exterior thereof around the recess, and moving the blank in a reverse direction out of the die to draw the exterior thereof to cylindrical form while maintaining the cone-shaped end of the blank in its original form.

31. The method of making a nut body, which comprises forcing a blank into a rearwardly flared opening in a movable die and then moving the die and blank as a unit in the same direction to move the blank against a stationary tool to form a recess in the end of the blank and flare the wall thereof about the recess, and then moving the blank in a reverse direction out of the die to draw the expanded wall to cylindrical form and increase the height of said wall.

32. Mechanism for making a nut body, comprising a movably supported die having an opening which flares outwardly at one end, means for projecting a blank into the small end of the opening, and means engaged by the inner end of the blank while in the opening to form a recess therein and expand the wall of the blank about said recess and to thereafter move said blank in a reverse direction to discharge the same from the die at the point of entrance and contract the previously expanded wall.

33. Mechanism for making a nut body, comprising a movably supported die having an opening which flares outwardly at one end, means for projecting a blank into the small end of the opening, means engaged by the inner end of the blank while in the opening to form a recess therein and expand the wall of the blank about said recess and to thereafter move said blank in a reverse direction to discharge the same from the die at the point of entrance and contract the previously expanded wall, and means to limit movement of the die in said last-named direction.

34. Mechanism for making a nut body, comprising a movably supported die having an opening which flares outwardly at one end, means for projecting a blank into the small end of the opening, means engaged by the inner end of the blank while in the opening to form a recess therein and expand the wall of the blank about said recess and to thereafter move said blank in a reverse direction to discharge the same from the die at the point of entrance and contract the previously expanded wall, means to limit movement of the die in said last-named direction, and a spring urging said die toward said limiting means.

35. The method of making a nut body, which comprises forcing a blank into an opening in a movable die by movement of a punch having a recess in its end adjacent the die so as to enclose the blank within the die opening and the recess in the punch, and then by contact of the punch with the die moving said punch and die as a unit against a relatively stationary tool.

36. Mechanism for making a nut body, comprising a suitably supported movable die having an opening, a relatively stationary tool cooperating with said die, a punch having a recess in the face thereof, and means for advancing the punch toward the die to first enclose a blank within said die opening and the recess in the punch, and thereafter by contact of the punch with the die advance the punch and die as a unit toward the relatively stationary tool.

RICHARD LESTER WILCOX.

REFERENCES CITED

The following references are of record in the file of this patent:

UNITED STATES PATENTS

| Number | Name | Date |
|---|---|---|
| 911,599 | Lackner | Feb. 6, 1909 |
| 1,408,917 | Wilcox | Mar. 7, 1922 |
| 2,112,284 | Gaess | Mar. 29, 1938 |